(12) United States Patent
Suzuki

(10) Patent No.: US 9,221,176 B2
(45) Date of Patent: Dec. 29, 2015

(54) ROBOT SYSTEM AND METHOD FOR CONTROLLING THE SAME

(71) Applicant: CANON KABUSHIKI KAISHA, Tokyo (JP)

(72) Inventor: Hideaki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/178,167

(22) Filed: Feb. 11, 2014

(65) Prior Publication Data

US 2014/0229005 A1   Aug. 14, 2014

(30) Foreign Application Priority Data

Feb. 14, 2013   (JP) ................................. 2013-026158

(51) Int. Cl.
*G05B 19/04* (2006.01)
*G05B 19/18* (2006.01)
*B25J 9/16* (2006.01)

(52) U.S. Cl.
CPC .............. *B25J 9/1692* (2013.01); *B25J 9/1697* (2013.01); *G05B 2219/39045* (2013.01); *G05B 2219/39057* (2013.01); *G05B 2219/45064* (2013.01); *Y10S 901/09* (2013.01); *Y10S 901/47* (2013.01)

(58) Field of Classification Search
CPC .................. B25J 9/1692; B25J 9/1697; G05B 2219/39045; G05B 2219/39057; G05B 2219/45064; Y10S 901/47; Y10S 901/09
USPC .................. 700/254, 259; 901/9, 47
See application file for complete search history.

(56) References Cited

U.S. PATENT DOCUMENTS

| | | | | |
|---|---|---|---|---|
| 4,831,549 | A | * | 5/1989 | Red et al. ........................ 700/254 |
| 6,070,109 | A | * | 5/2000 | McGee et al. ................. 700/259 |
| 6,349,245 | B1 | * | 2/2002 | Finlay ............................ 700/245 |

(Continued)

FOREIGN PATENT DOCUMENTS

| | | |
|---|---|---|
| CN | 1033590 A | 7/1989 |
| CN | 1727839 A | 2/2006 |

(Continued)

OTHER PUBLICATIONS

Horaud, et al., "Hand-Eye Calibration", International Journal of Robotics Research, Jun. 1995, pp. 195-210, vol. 14, No. 3.

*Primary Examiner* — Jason Holloway
*Assistant Examiner* — Rachid Bendidi
(74) *Attorney, Agent, or Firm* — Canon U.S.A., Inc. IP Division

(57) ABSTRACT

A robot system which requires no manual teaching operation in acquiring calibration values for coordinate transformation, and improves the calibration accuracy includes a robot body, a camera, and a control apparatus. The control apparatus measures, via the camera, a calibration plate at each position and orientation of a first position and orientation group including a reference measurement position and orientation and a position and orientation within a first offset range, calculates a first calibration value based on the measurement value, measures, via the camera, the calibration plate at each position and orientation of a second position and orientation group including a reference operation position and orientation different from the reference measurement position and orientation, and a position and orientation within a second offset range, calculates a second calibration value based on the measurement value, and activates the robot body by using the first and second calibration values.

11 Claims, 10 Drawing Sheets

(56) References Cited

U.S. PATENT DOCUMENTS

| | | |
|---|---|---|
| 7,200,260 B1 * | 4/2007 | Watanabe et al. ............ 382/153 |
| 8,135,208 B1 * | 3/2012 | Vangal-Ramamurthy .... 382/153 |
| 8,180,487 B1 * | 5/2012 | Vangal-Ramamurthy et al. ............................ 700/259 |
| 2005/0159842 A1 * | 7/2005 | Ban et al. ...................... 700/245 |
| 2005/0225278 A1 * | 10/2005 | Ban et al. ................. 318/568.11 |
| 2005/0273199 A1 * | 12/2005 | Ban et al. ...................... 700/248 |
| 2008/0004750 A1 * | 1/2008 | Ban et al. ...................... 700/245 |
| 2008/0188983 A1 * | 8/2008 | Ban et al. ...................... 700/245 |
| 2010/0141776 A1 * | 6/2010 | Ban et al. ...................... 348/187 |
| 2012/0143370 A1 * | 6/2012 | Shieh et al. ................... 700/254 |

FOREIGN PATENT DOCUMENTS

| | | |
|---|---|---|
| CN | 101100061 A | 1/2008 |
| EP | 0301527 A2 | 2/1989 |
| EP | 1555508 A1 | 7/2005 |
| EP | 1875991 A2 | 1/2008 |
| EP | 2210715 A2 | 7/2010 |
| JP | 06206186 A | 7/1994 |
| JP | 10063317 A | 3/1998 |
| JP | 2011-067889 A | 4/2011 |
| WO | 2011/143576 A2 | 11/2011 |

* cited by examiner

FIG.5

| POSITION AND ORIENTATION GROUP | CALIBRATION POSITION AND ORIENTATION | REFERENCE POSITION AND ORIENTATION | POSITION AND ORIENTATION OFFSET ||||||
|---|---|---|---|---|---|---|---|---|
| | | | dx[mm] | dy[mm] | dz[mm] | dθx[deg] | dθy[deg] | dθz[deg] |
| MEASUREMENT POSITION AND ORIENTATION | $^R H_T[1]$ | $^R H_T^{MPose}$ | 0 | 0 | 0 | 0 | 0 | 0 |
| | $^R H_T[2]$ | | 2 | 0 | 0 | 0 | 5 | 0 |
| | $^R H_T[3]$ | | 0 | 2 | 0 | -5 | 0 | 0 |
| | ... | | ... | ... | ... | ... | ... | ... |
| | $^R H_T[N]$ | | dx[N] | dy[N] | dz[N] | dθx[N] | dθy[N] | dθz[N] |
| OPERATION POSITION AND ORIENTATION | $^R H_T[N+1]$ | $^R H_T^{WPose}$ | 0 | 0 | 0 | 0 | 0 | 0 |
| | $^R H_T[N+2]$ | | 5 | 0 | 0 | 0 | 10 | 0 |
| | $^R H_T[N+3]$ | | 0 | 5 | 0 | -10 | 0 | 0 |
| | ... | | ... | ... | ... | ... | ... | ... |
| | $^R H_T[M]$ | | dx[M] | dy[M] | dz[M] | dθx[M] | dθy[M] | dθz[M] |
| OTHER POSITIONS AND ORIENTATIONS | $^R H_T[M+1]$ | (SET ARBITRARY POSITION AND ORIENTATION) ||||||||
| | ... | |
| | $^R H_T[L]$ | |

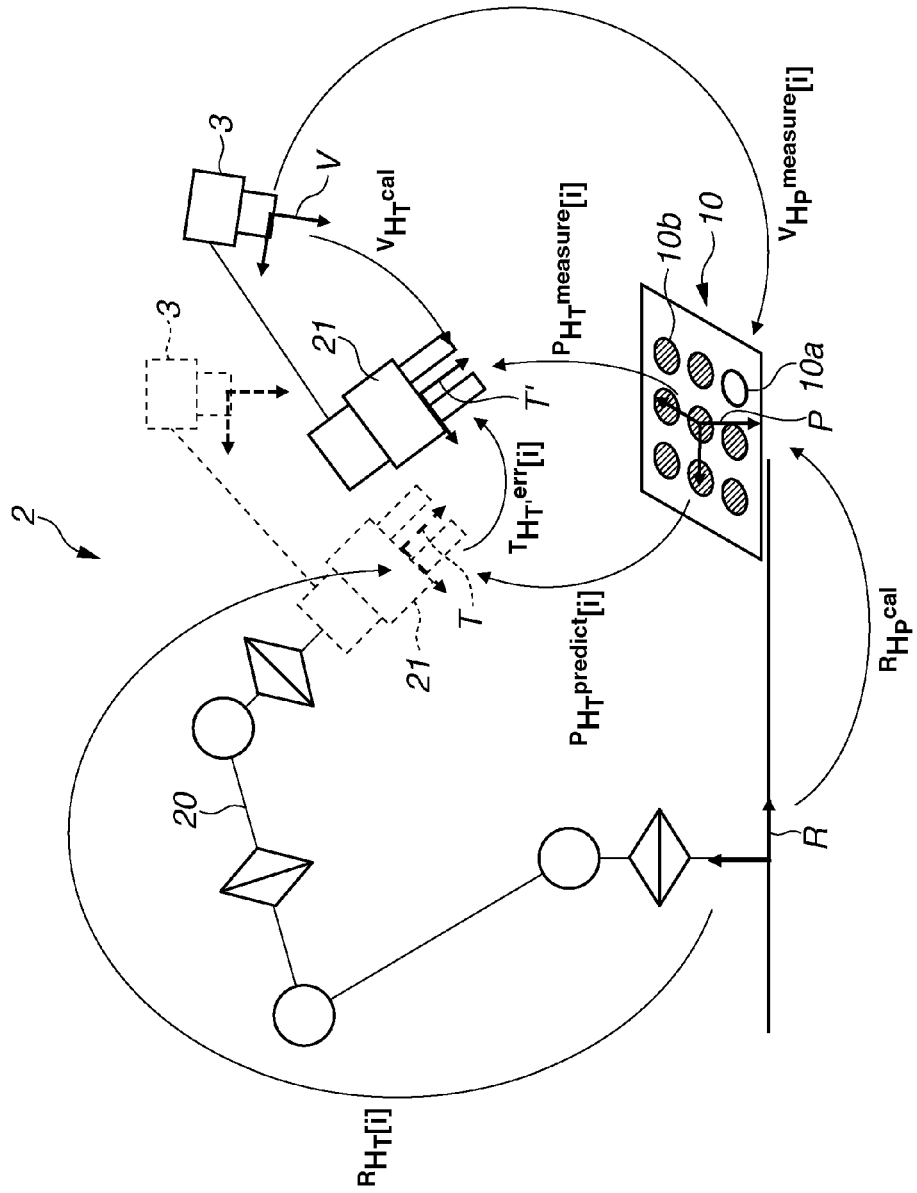

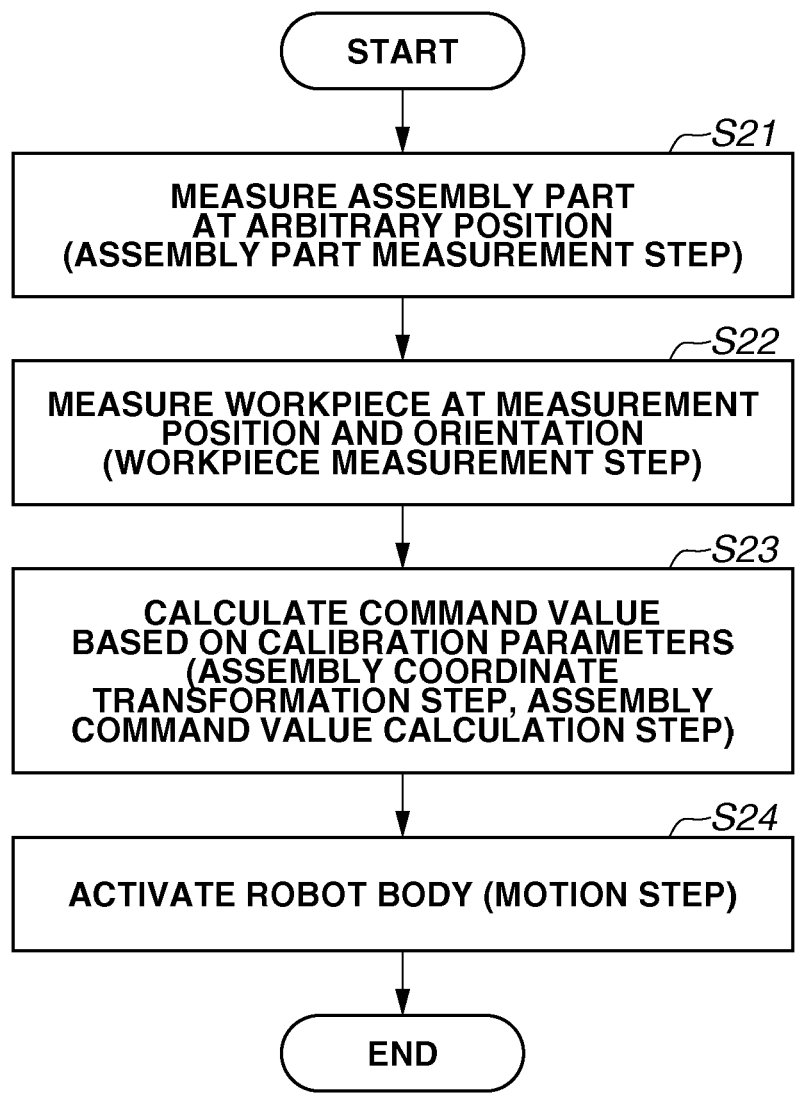

ROBOT SYSTEM AND METHOD FOR CONTROLLING THE SAME

BACKGROUND OF THE INVENTION

1. Field of the Invention

The present invention relates to a robot system which utilizes an articulated arm driven by controlling a plurality of joints and a visual sensor, and to a method for controlling the robot system.

2. Description of the Related Art

A conventional robot apparatus is provided with a vertical articulated arm, an end effector (hereinafter referred to as a robot body), a control apparatus for controlling them, and a visual sensor (hereinafter referred to as a camera) attached to the end of the arm. In this robot apparatus, the camera measures a target object, such as a workpiece, the control apparatus calculates the position and orientation of the target object based on the result of the measurement, and, based on the calculated position and orientation of the target object, controls the position and orientation of the robot body.

Generally, the measurement coordinate system for the camera is different from the motion coordinate system for the robot body. Therefore, to acquire a motion target value (command value) of the robot body based on a measurement value of the camera, it is necessary to perform coordinate transformation on the measurement value of the camera from the measurement coordinate system to the motion coordinate system. To perform this coordinate transformation, it is necessary that calibration values (coordinate transformation formula) have been acquired by performing a calibration operation on the measurement coordinate system and the motion coordinate system in advance.

As an example of this calibration operation, a certain method measures, while sequentially changing over a plurality of positions and orientations of a robot body, a reference member for calibration by using a camera at each position and orientation of the robot body. This calibration method is known as the hand-eye calibration method (refer to Japanese Patent Application Laid-Open No. 10-063317, and Hand-Eye Calibration 1 (Radu Horaud and FadiDornaika, 1995)). Based on a relation between the command value to the end of the robot body at each position and orientation of the robot body, and the measurement value of the reference member for calibration from the camera, this method obtains a relation between the motion coordinate system and the measurement coordinate system so that a residual error is minimized, and then acquires calibration values.

With a known method as another example of calibration operation, a camera measures a reference workpiece, and an operator causes a robot body to approach the reference workpiece by using a teaching pendant (refer to Japanese Patent Application Laid-Open No. 6-206186). This method, after the camera measures the reference workpiece, causes the robot body to approach the reference workpiece, obtains a relation between the measurement value obtained by the camera and the command value to the robot body, and acquires calibration values for the measurement coordinate system and the motion coordinate system.

Although the coordinate calibration method discussed in Japanese Patent Application Laid-Open No. 10-063317 does not take a motion error of the robot body into consideration, a motion error is actually generated by a mechanical error and bending on the arm. On the other hand, in an actual operation, the measurement position and orientation of the robot body emphasizing the measurement accuracy at the time of workpiece measurement are largely different from the actual operation position and orientation of the robot body. Since the above-described motion error of the robot body largely depends on the position and orientation of the robot body, it has been difficult to sufficiently improve accuracy even after performing coordinate calibration in the above-described case.

Such position and orientation errors of the robot body can be prevented to a certain extent by using a method in which an operator teaches the actual operation position and orientation to the robot body, as with the coordinate calibration method discussed in Japanese Patent Application Laid-Open No. 6-206186. However, the coordinate calibration method discussed in Japanese Patent Application Laid-Open No. 6-206186 requires a teaching operation by the operator and, therefore, requires a longer operation time for coordinate adjustment than automated operation does. Further, with the relevant method, the accuracy of calibration values may vary depending on the skill level of the operator.

SUMMARY OF THE INVENTION

The present invention is directed to a robot system which requires no manual teaching operation in acquiring calibration values for coordinate transformation in a robot having a visual sensor while improving the accuracy in coordinate calibration, and to a method for controlling the robot system.

According to an aspect of the present invention, a robot system includes a robot body including an articulated arm and an end effector supported by the articulated arm, a visual sensor provided on the robot body, and a control apparatus configured to control a position and orientation of the robot body, and to calculate a position and orientation of a workpiece by using a measurement value measured via the visual sensor. The control apparatus performs the following processing: measuring, via the visual sensor, a reference member at each position and orientation of a first position and orientation group including a first reference position and orientation of the robot body and a position and orientation of the robot body within a first offset range surrounding the first reference position and orientation; calculating a first calibration value by using the measurement value of the reference member, the measurement value being measured via the visual sensor at each position and orientation of the first position and orientation group; measuring, via the visual sensor, the reference member at each position and orientation of a second position and orientation group including a second reference position and orientation of the robot body, which is different from the first reference position and orientation, and a position and orientation of the robot body within a second offset range surrounding the second reference position and orientation which is a range separated from the first offset range, or a range whose one part overlaps the first offset range and another part does not overlap the first offset range; calculating a second calibration value by using the measurement value of the reference member, the measurement value being measured via the visual sensor at each position and orientation of the second position and orientation group; measuring the workpiece via the visual sensor; and activating the robot body by using the first calibration value and the second calibration value.

According to another aspect of the present invention, a method for controlling a robot system, which includes a robot body including an articulated arm and an end effector supported by the articulated arm, a visual sensor provided on the robot body, and a control apparatus configured to control a position and orientation of the robot body, and to calculate a position and orientation of a workpiece by using a measurement value measured via the visual sensor, includes the following processing performed by the control apparatus: measuring, via the visual sensor, a reference member at each position and orientation of a first position and orientation group including a first reference position and orientation of the robot body and a position and orientation of the robot body within a first offset range surrounding the first reference position and orientation; calculating a first calibration value by using the measurement value of the reference member, the measurement value measured via the visual sensor at each position and orientation of the first position and orientation group; measuring, via the visual sensor, the reference member at each position and orientation of a second position and orientation group including a second reference position and orientation of the robot body that is different from the first reference position and orientation, a the position and orientation of the robot body within a second offset range surrounding the second reference position and orientation which is a range separated from the first offset range, or a range whose one part overlaps the first offset range and another part does not overlap the first offset range; calculating a second calibration value by using the measurement value of the reference member, the measurement value measured via the visual sensor at each position and orientation of the second position and orientation group; measuring the workpiece via the visual sensor; and activating the robot body by using the first calibration value and the second calibration value.

Further features of the present invention will become apparent from the following description of exemplary embodiments with reference to the attached drawings.

BRIEF DESCRIPTION OF THE DRAWINGS

FIG. 4A illustrates a reference measurement position and orientation, and FIG. 4B illustrates a reference operation position and orientation.

FIG. 5 is a table illustrating examples of position and orientation offsets in each position and orientation group.

FIG. 7 illustrates a position and orientation of the robot body when calculating a residual error of the basic calibration values in the robot system according to the first exemplary embodiment of the present invention.

FIG. 8A illustrates a position and orientation at the time of measurement by a camera. FIG. 8B illustrates a position and orientation when moving the robot body without performing correction.

FIG. 8C illustrates a position and orientation when moving the robot body with correction performed.

FIG. 10 is a flowchart illustrating processing for performing coordinate calibration in the robot system according to the second exemplary embodiment of the present invention.

DESCRIPTION OF THE EMBODIMENTS

Figure 1:
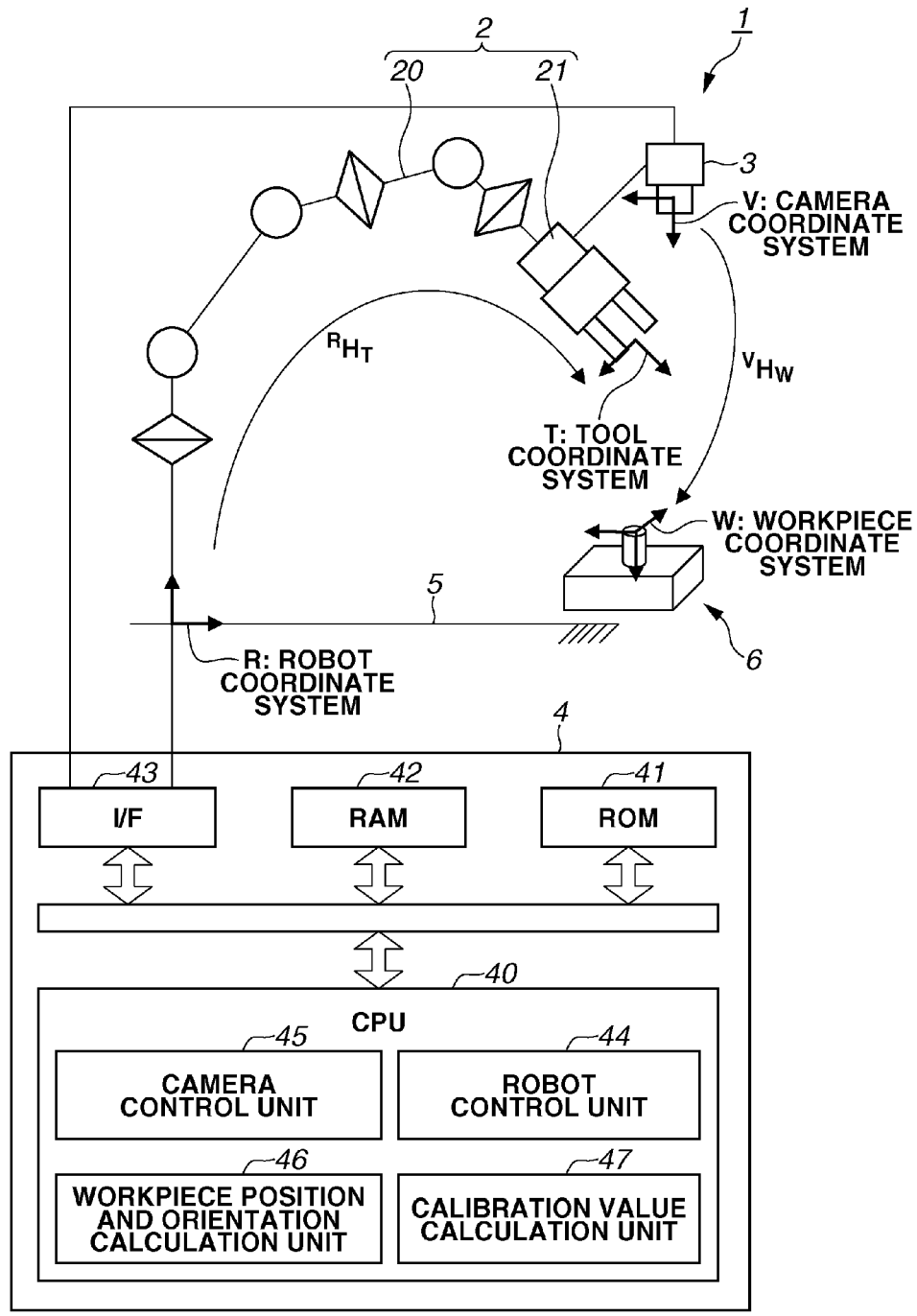
FIG. 1 schematically illustrates a configuration of a robot system according to a first exemplary embodiment of the present invention.

Various exemplary embodiments, features, and aspects of the invention will be described in detail below with reference to the drawings.

Prior to the descriptions of a robot system 1 according to a first exemplary embodiment, the definitions for formula representations in the present specification will be described below. In the present specification, positions and orientations (having six degrees of freedom) of an articulated arm 20, a hand 21, a camera 3, and a workpiece 6 constituting the robot system 1 are represented by a three-dimensional coordinate system. Further, a relative position and orientation between arbitrary two coordinate systems are represented by a coordinate transformation matrix (homogeneous transformation matrix).

A coordinate transformation matrix $^AH_B$ represents the relative position and orientation from an arbitrary coordinate system A toward an arbitrary coordinate system B. The coordinate transformation matrix $^AH_B$ is also described as a relative position and orientation $^AH_B$. For example, in the present exemplary embodiment, as illustrated in FIG. 1, a tool coordinate system T exists at a relative position and orientation $^RH_T$ with reference to a robot coordinate system R (described below), and a workpiece coordinate system W exists at a relative position and orientation $^VH_W$ with reference to a camera coordinate system V (described below).

The relative position and orientation $^AH_B$ is defined by Formula (1) by using a rotation matrix Rot and a translation vector t.

$$^AH_B = \begin{bmatrix} Rot & t \\ 000 & 1 \end{bmatrix} \quad (1)$$

Referring to Formula (1), the rotation matrix Rot is a 3×3 matrix representing a three-dimensional rotation, and the translation vector t is a 3×1 three-dimensional vector. When X, Y, and Z components of the amount of translation movement are represented as $t_x$, $t_y$, and $t_z$, respectively, and rotational components around X, Y, and Z axes are represented as $\theta_x$, $\theta_y$, and $\theta_z$, respectively, the rotation matrix Rot is defined by Formula (2), and the translation vector t is defined by Formula (3).

$$Rot = Rotz \cdot Roty \cdot Rotx \quad (2)$$

$$= \begin{bmatrix} \cos\theta_z & -\sin\theta_z & 0 \\ \sin\theta_z & \cos\theta_z & 0 \\ 0 & 0 & 1 \end{bmatrix} \begin{bmatrix} \cos\theta_y & 0 & \sin\theta_y \\ 0 & 1 & 0 \\ -\sin\theta_y & 0 & \cos\theta_y \end{bmatrix}$$

$$\begin{bmatrix} 1 & 0 & 0 \\ 0 & \cos\theta_x & -\sin\theta_x \\ 0 & \sin\theta_x & \cos\theta_x \end{bmatrix}$$

-continued $$t = \begin{bmatrix} t_x \\ t_y \\ t_z \end{bmatrix} \quad (3)$$

Referring to Formula (2), rotational components around the X, Y, and Z axes are represented by rotation matrices Rotx, Roty, and Rotz, respectively.

As the characteristics of a coordinate transformation matrix, a relation between arbitrary coordinate systems A, B, and C is given by Formula (4).

$$^{A}H_{C} = {}^{A}H_{B} \cdot {}^{B}H_{C} \quad (4)$$

Specifically, by multiplying the relative position and orientation $^{A}H_{B}$ of the coordinate system B with respect to the coordinate system A by a relative position and orientation $^{B}H_{C}$ of the coordinate system C with respect to the coordinate system B, a relative position and orientation $^{A}H_{C}$ of the coordinate system C with respect to the coordinate system A can be obtained.

To obtain a relative position and orientation $^{B}H_{A}$ of the coordinate system A with respect to the coordinate system B, an inverse matrix is calculated by using Formula (5).

$$^{B}H_{A} = ({}^{A}H_{B})^{-1} \quad (5)$$

To obtain the coordinate transformation matrix $^{A}H_{B}$ based on a vector $(t_x, t_y, t_z, \theta_x, \theta_y, \theta_z)$ including respective components of the amount of translation movement and the rotational components around respective axes, it is essentially necessary to represent it by using Formulas (1) to (3). In the present specification, however, it is simply represented by Formula (6) by using $H(t_x, t_y, t_z, \theta_x, \theta_y, \theta_z)$.

$$H(t_x, t_y, t_z, \theta_x, \theta_y, \theta_z) = {}^{A}H_{B} \quad (6)$$

Likewise, an inverse transformation formula for obtaining the vector $(t_x, t_y, t_z, \theta_x, \theta_y, \theta_z)$ including respective components of the amount of translation movement and the rotational components around respective axes based on the coordinate transformation matrix $^{A}H_{B}$ is represented by pose($^{A}H_{B}$) in Formula (7), instead of using the representation by Formulas (1) to (3).

$$\text{pose}({}^{A}H_{B}) = (t_x, t_y, t_z, \theta_x, \theta_y, \theta_z) \quad (7)$$

(where $-180\ [\text{deg}] < \theta_x, \theta_y, \theta_z < 180\ [\text{deg}]$)

In transformation by pose($^{A}H_{B}$), when $\theta_y$ equals $\pm 90$ [deg], although the solution cannot be uniquely obtained, one of a plurality of solutions is to be calculated. In the present exemplary embodiment, the target range of the coordinate transformation matrix exists within a small angle range of about a motion error of a robot body 2. Therefore, since it is rare that $\theta_y$ equals $\pm 90$ [deg], the influence of the above-described case where the solution cannot be uniquely obtained is very small.

The following describes the robot system 1 according to the present exemplary embodiment.

As illustrated in FIG. 1, the robot system 1 includes the robot body 2 having the articulated arm 20 and the hand (end effector) 21, the monocular camera (visual sensor) 3 provided on the robot body 2, and a control apparatus 4 for controlling the position and orientation of the robot body 2.

The articulated arm 20 (hereinafter referred to as an arm) is fixed to a base 5. The robot coordinate system R for representing the position and orientation of the arm 20 is set to the base 5 with reference to the base 5. The workpiece 6 is mounted on the base 5. The workpiece coordinate system W is set to the workpiece 6 with reference to the workpiece 6.

The arm 20 is a six-axis vertical articulated arm 20 provided with seven links and six joints for swingably or rotatably connecting respective links. Although, in the present exemplary embodiment, the six-axis vertical articulated arm 20 is applied, the arm 20 is not limited thereto. The number of axes may be suitably changed according to application and purpose.

Each joint is provided with a motor or, as required, a linear actuator for driving each joint as an output device. Each joint is provided with an encoder for detecting the rotational angle of the motor, a current sensor for detecting the current to be supplied to each motor, and a torque sensor for detecting the torque of each joint, as input devices.

The arm 20 drives each joint according to a command value output from a robot control unit 44 of the control apparatus 4 to adjust the position and orientation of the hand 21. The robot control unit 44 calculates the angle to be taken by each joint of the arm 20 according to the target value of the relative position and orientation $^{R}H_{T}$ of the tool coordinate system T (described below) with reference to the robot coordinate system R, and outputs the command value to each joint. The robot control unit 44 is capable of acquiring current angle information for each joint from the encoder, and calculating the current relative position and orientation $^{R}H_{T}$ of the tool coordinate system T (described below).

The hand 21 is supported at the end of the arm 20. The position and orientation of the hand 21 is adjusted by the motion of the arm 20. The hand 21 is provided with, for example, three fingers capable of gripping the workpiece 6. The tool coordinate system T is set to the hand 21 with reference to the hand 21. In the present exemplary embodiment, the hand 21 capable of gripping the workpiece 6 is applied as an end effector. However, the end effector is not limited thereto and may be, for example, a mechanism for holding the workpiece 6 by using a method other than gripping, a tool for machining the workpiece 6, and all other types of end effectors capable of operating the workpiece 6.

The camera 3 is supported at the end of the arm 20 or at the hand 21. In response to a command from a camera control unit 45 of the control apparatus 4, the camera 3 captures an image, and transmits image data to the camera control unit 45. The camera coordinate system (visual sensor coordinate system) V is set to the camera 3 with reference to an optical axis direction and the vertical and horizontal directions of an imaging field. In the present exemplary embodiment, the camera 3 is provided so as to be oriented toward the end of the hand 21 in such a way that the optical axis forms an angle of about 45 degrees with respect to the longitudinal direction of the hand 21.

The control apparatus 4 connected to the robot body 2 includes a computer for controlling the robot body 2. The computer constituting the control apparatus 4 includes, for example, a central processing unit (CPU) 40, a read-only memory (ROM) 41 for storing programs for controlling each unit, a random access memory (RAM) 42 for temporarily storing data, and an input/output interface (I/F) circuit 43 enabling communication with the robot body 2.

The CPU 40 includes the above-described robot control unit 44, the camera control unit 45, a workpiece position and orientation calculation unit 46, and a calibration value calculation unit 47.

The camera control unit 45 transmits image data acquired by the camera 3 to the workpiece position and orientation calculation unit 46 of the control apparatus 4. The workpiece position and orientation calculation unit 46 performs image processing on the received image data to calculate the position and orientation of the workpiece 6. The calculated output value is data equivalent to the relative position and orientation $^{V}H_{W}$ of the workpiece coordinate system W with reference to the camera coordinate system V.

The workpiece position and orientation calculation unit 46 transmits the result of the processing to the calibration value calculation unit 47. The calibration value calculation unit 47 calculates calibration values based on the positions and orientations $^{R}H_{T}$ and $^{V}H_{W}$, which are acquired from the robot control unit 44 and the workpiece position and orientation calculation unit 46, respectively, that is, the position and orientation $^{R}H_{T}$ of the hand 21 in the robot coordinate system R, and the position and orientation $^{V}H_{W}$ of the workpiece 6 in the camera coordinate system V.

Figure 2:
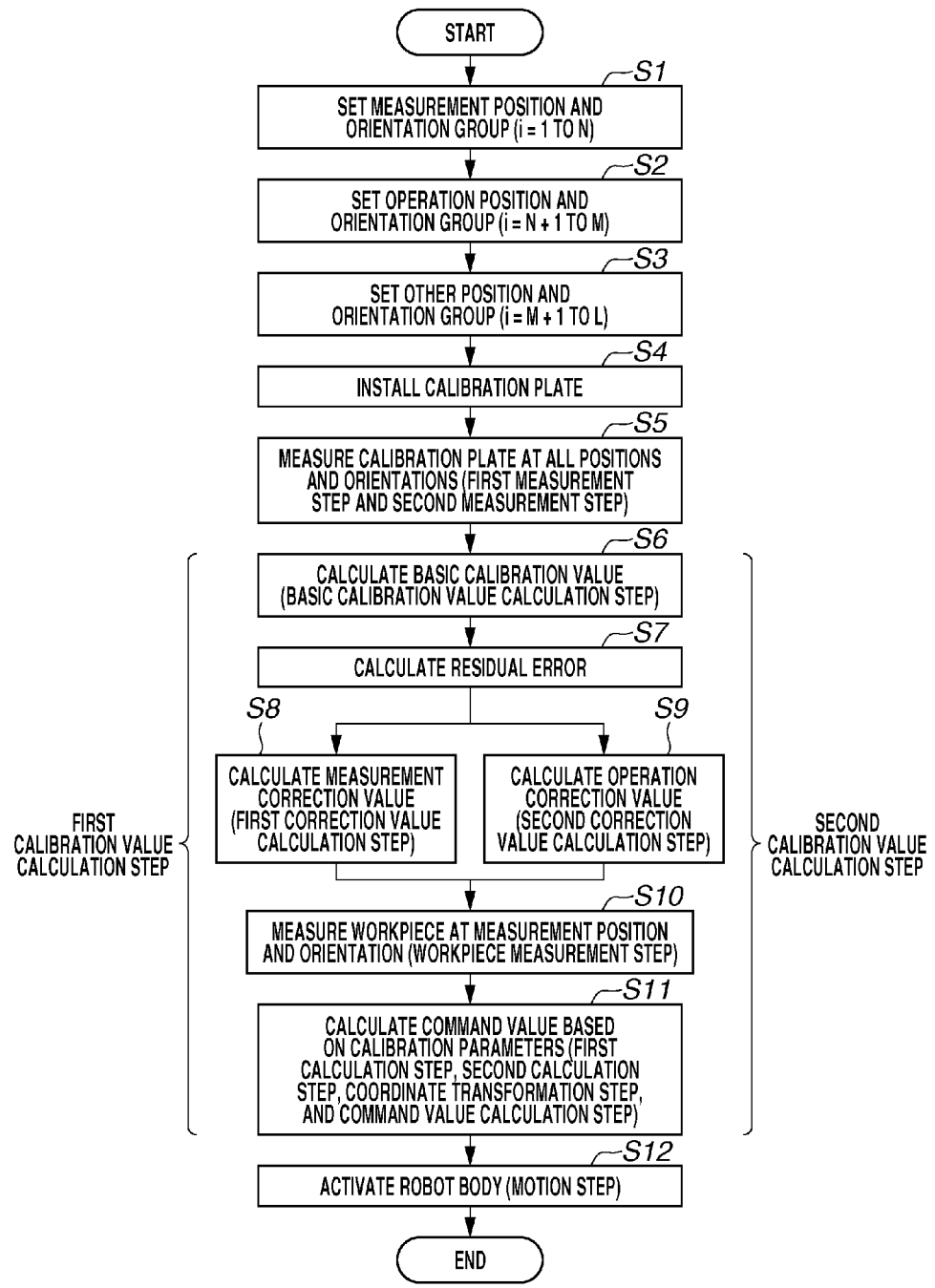
FIG. 2 is a flowchart illustrating processing for performing coordinate calibration in the robot system according to the first exemplary embodiment of the present invention.

FIG. 2 is a flowchart illustrating processing for calculating calibration values in the above-described robot system 1, performing coordinate transformation based on the calibration values to calculate the command value to the robot body 2, and outputting the command value to the robot body 2 to cause the hand 21 to move to the workpiece 6 and then grip it.

Figure 3:
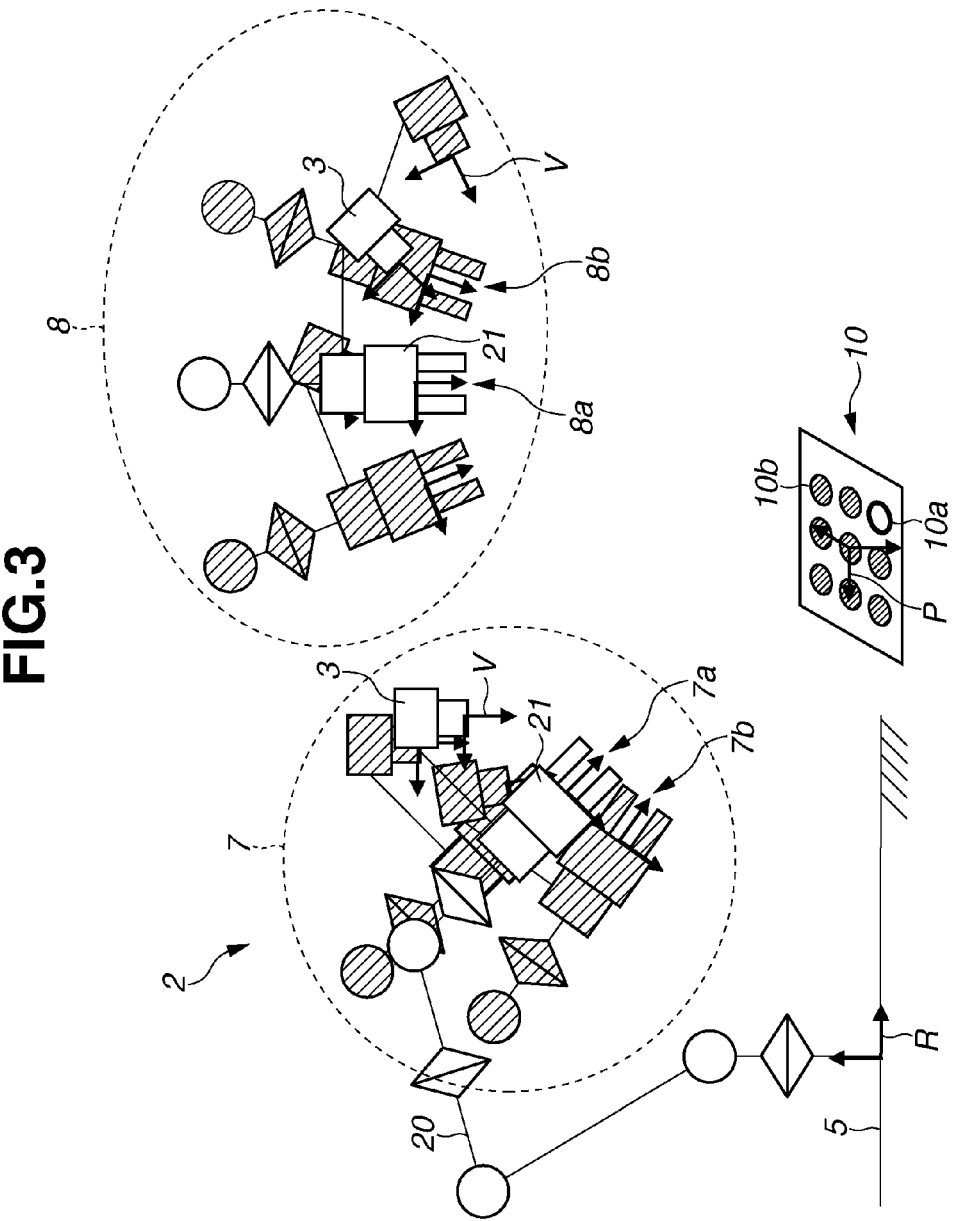
FIG. 3 illustrates positions and orientations of a measurement position and orientation group and an operation position and orientation group of the robot system according to the first exemplary embodiment of the present invention.

In steps S1 to S3, to acquire calibration values before actually performing an operation with the workpiece 6, each of the positions and orientations (command values) of a plurality of position and orientation groups is set to the control apparatus 4 so that the robot body 2 takes a plurality of positions and orientations. Each position and orientation group is a set of the command values $^{R}H_{T}$ representing a plurality of positions and orientations of the tool coordinate system T of the robot body 2. The i-th setting of a position and orientation is represented as $^{R}H_{T}[i]$. In the present exemplary embodiment, the plurality of position and orientation groups include a measurement position and orientation group 7, an operation position and orientation group 8, and another position and orientation group, as illustrated in FIG. 3. To obtain each calibration value in the processing in step S6 and subsequent steps, in steps S1 to S3, it is necessary to set at least three different positions and orientations regardless of the number of position and orientation groups.

In step S1, a user arbitrarily sets N (N≥1) positions and orientations of the robot body 2 for i=1 to N as the measurement position and orientation group (first position and orientation group) 7. The measurement position and orientation group 7 is considered as a set of a reference measurement position and orientation (first reference position and orientation) 7a and a periphery measurement position and orientation 7b within a predetermined first offset range surrounding the reference measurement position and orientation 7a.

The reference measurement position and orientation 7a is a position and orientation at which the camera 3 faces the workpiece 6 straighter than at a reference operation position and orientation 8a (described below). The reference measurement position and orientation 7a is an arbitrary position and orientation close to a measurement position and orientation at the time of measurement of the workpiece 6 by using the camera 3. Specifically, for example, the user can use a measurement position and orientation set by a control program which uses the robot body 2, and a measurement position and orientation at which the robot body 2 was actually taught to measure the workpiece 6.

Figure 4A:
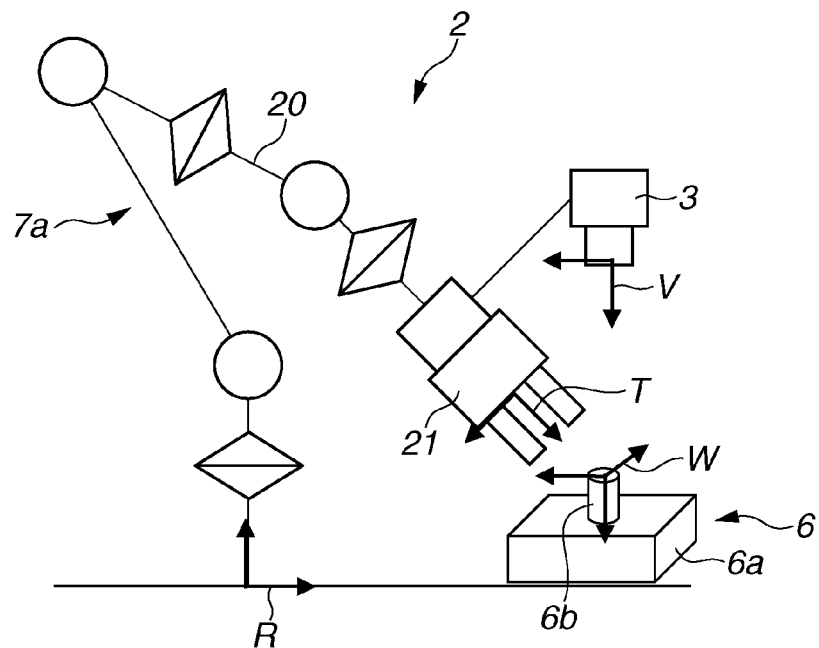
FIGS. 4A and 4B illustrate the robot system according to the first exemplary embodiment of the present invention.

The measurement position and orientation at the time of measurement of the workpiece 6 by using the camera 3 is, for example, a position and orientation at which the camera 3 faces the workpiece 6 straight and is capable of measuring characteristic shapes and marks of the workpiece 6 with a small error. For example, as illustrated in FIG. 4A, the workpiece 6 is assumed to include a main body 6a having a rectangular shape, and a projection 6b having a cylindrical shape. In this case, the measurement position and orientation can be a position and orientation at which the projection direction of the projection 6b coincides with the optical axis of the camera 3 so that the rotational direction of the main body 6a and the position of the projection 6b are simultaneously measured.

The first offset range of the periphery measurement position and orientation 7b with respect to the reference measurement position and orientation 7a is desirably set in consideration of a width which enables the fine-adjustment of the robot body 2 with respect to the reference measurement position and orientation 7a. For example, as illustrated in the table in FIG. 5, the user defines offset values for each of the six degrees of freedom for the position and orientation of the reference measurement position and orientation 7a, and sets these offset values as the periphery measurement position and orientation 7b. Then, the user describes each offset value in the RAM 42 of the control apparatus 4 as a control program to set each position and orientation of the measurement position and orientation group 7 to the control apparatus 4. This set range is the first offset range.

In this case, for example, to make it easier for the camera 3 to actually measure the workpiece 6, the user sets as a measurement position and orientation $^{R}H_{T}^{MPose}$ the reference measurement position and orientation 7a taught to the robot body 2 by moving the robot body 2. In this case, adjustable ranges for adjusting the position and orientation of the robot body 2 from the measurement position and orientation $^{R}H_{T}^{MPose}$ (the reference measurement position and orientation 7a) are assumed to be about ±2 [mm] and ±5 [deg], respectively. In this case, the user sets as the periphery measurement position and orientation 7b a plurality of positions and orientations with offset values added to the measurement position and orientation $^{R}H_{T}^{MPose}$ within a range of ±2 [mm] and ±5 [deg], respectively, as a predetermined first offset range.

When an offset value (dx[i], dy[i], dz[i], dθ$_x$[i], dθ$_y$[i], dθ$_z$[i]) is added to the measurement position and orientation $^{R}H_{T}^{MPose}$ (the reference measurement position and orientation 7a), the i-th position and orientation $^{R}H_{T}[i]$ is represented by Formula (8).

$$^{R}H_{T}[i] = {^{R}H_{T}^{MPose}} \cdot H(dx[i], dy[i], dz[i], d\theta_x[i], d\theta_y[i], d\theta_z[i]) \qquad (8)$$

(i=1, 2, ..., N)

The user does not necessarily store the above-described preset first offset range in the control apparatus 4 as a control program. For example, the user may teach each position and orientation to the robot control unit 44 by actually moving the robot body 2 with a teaching pendant.

In step S2, the user arbitrarily sets M−N (M−N≥2) positions and orientations of the robot body 2 for i=N+1 to M as the operation position and orientation group (second position and orientation group) 8. As illustrated in FIG. 3, the operation position and orientation group 8 is considered as a set of the reference operation position and orientation (second reference position and orientation) 8a and a periphery operation position and orientation 8b within a predetermined second offset range surrounding the reference operation position and orientation 8a.

The reference operation position and orientation 8a is a position and orientation different from the reference measurement position and orientation 7a, at which the hand 21 faces the workpiece 6 straighter than at the reference operation position and orientation 7a. The reference operation position and orientation 8a is a position and orientation close to an operation position and orientation used when performing an operation on the workpiece 6. Specifically, the user can use the operation position and orientation of the robot body 2 set in a control program which uses the robot body 2, and the operation position and orientation actually taught to the robot body 2 to perform an operation on the workpiece 6.

Figure 4B:
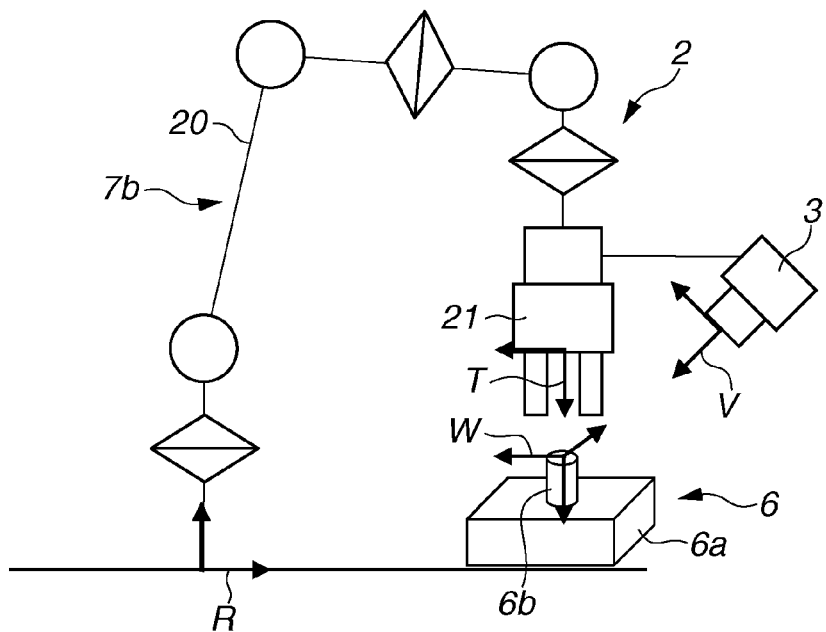

The operation position and orientation used when performing an operation on the workpiece 6 by using the camera 3 is, for example, a position and orientation at which the hand 21 is able to grip the workpiece 6 while facing straight a gripping portion of the workpiece 6. For example, as illustrated in FIG. 4B, when the workpiece 6 is provided with the main body 6a and the projection 6b, the relevant operation position and orientation is a position and orientation at which the hand 21 grips the projection 6b. In this case, the user sets the tool coordinate system T and the workpiece coordinate system W so that, when the hand 21 grips the projection 6b of the workpiece 6, the tool coordinate system T of the hand 21 coincides with the workpiece coordinate system W of the workpiece 6.

The second offset range of the periphery operation position and orientation 8b with respect to the reference operation position and orientation 8a is a range separated from the first offset range, or a range whose one part overlaps the first offset range and another part does not overlap the first offset range. In other words, the first offset range and the second offset range may partly overlap or may not overlap each other. The two offset ranges do not completely coincide with each other. Further, neither one offset range is included in the other offset range.

The second offset range is desirably set in consideration of ranges of position and orientation errors which can be taken by the workpiece 6 mounted on the base 5. For example, as illustrated in the table in FIG. 5, for the position and orientation of the reference operation position and orientation 8a, the user defines offset values for each of the six degrees of freedom, and sets these offset values as the periphery operation position and orientation 8b. Then, the user describes each offset value in the RAM 42 of the control apparatus 4 as a control program to set each position and orientation of the operation position and orientation group 8 to the control apparatus 4. This set range is the second offset range.

In this case, for example, the reference operation position and orientation 8a of the robot body 2 when the workpiece 6 exists at a structurally ideal position is assumed to be $^{R}H_{T}^{WPose}$. In this case, fluctuation ranges of the tool coordinate system T when the motion of the robot body 2 is corrected according to position and orientation errors of the workpiece 6 in the periphery of the reference operation position and orientation 8a are about ±5 [mm] and ±10 [deg], respectively. In this case, the user sets as the operation position and orientation group 8 a plurality of positions and orientations with offset values added to $^{R}H_{T}^{WPose}$ within a range of ±5 [mm] and ±10 [deg], respectively, as the predetermined second offset range.

Thus, the first offset range and the second offset range are, for example, several millimeters and several degrees. Therefore, in comparison with differences in positions and orientations between the measurement position and orientation group 7 and the operation position and orientation group 8 (several centimeters to several tens of centimeters, and several degrees to several tens of degrees), each offset range provides a small fluctuation range.

As described above, the first offset range setting and the second offset range setting are smaller than differences between the reference measurement position and orientation 7a and the reference operation position and orientation 8a. Specifically, in each of the measurement position and orientation group 7 and the operation position and orientation group 8 which are mutually largely separated, a correction value is calculated through operation in a narrow range. This improves the accuracy in coordinate calibration in comparison with a case, for example, where coordinate calibration is performed by using only positions and orientations of the measurement position and orientation group 7.

When the offset value (dx[i], dy[i], dz[i], d$\theta_x$[i], d$\theta_y$[i], d$\theta_z$[i]) is added to $^{R}H_{T}^{WPose}$ (the reference operation position and orientation 8a), the i-th position and orientation $^{R}H_{T}$[i] is represented by Formula (9).

$$^{R}H_{T}[i] = ^{R}H_{T}^{WPose} \cdot H(dx[i], dy[i], dz[i], d\theta_x[i], d\theta_y[i], d\theta_z[i]) \quad (9)$$

(i=N+1, N+2, ..., M)

In step S3, the user arbitrarily sets L−M (L−M≥1) positions and orientations of the robot body 2 for i=M+1 to L as another position and orientation group. Setting another position and orientation group in addition to the above-described measurement position and orientation group 7 and the operation position and orientation group 8 enables highly accurate calculation of basic calibration values (described below). However, it is not always necessary to set another position and orientation group in addition to the measurement position and orientation group 7 and the operation position and orientation group 8. At least two position and orientation groups are required. Therefore, the user may set only the measurement position and orientation group 7 and the operation position and orientation group 8, set four or more position and orientation groups, and set two groups other than the measurement position and orientation group 7 and the operation position and orientation group 8.

In step S4, as illustrated in FIG. 3, the user installs a calibration plate (reference member) 10 in a common field which is commonly included in the measurement area of the camera 3 when a plurality of positions and orientations set in each position and orientation group is taken by the robot body 2. The calibration plate 10 is, for example, a planar plate having a plurality of (at least three) circular patterns 10a and 10b of a predetermined size displayed thereon. The camera 3 can measure positions and orientations of the calibration plate 10 having six degrees of freedom.

Only one of the plurality of circular patterns of the calibration plate 10 is a hollow circular pattern 10a, which is placed at a corner, and others are solid circular patterns 10b. The existence of the hollow circular pattern 10a provides a totally asymmetrical arrangement about a point, and enables unique identification of the position and orientation of the calibration plate 10 having six degrees of freedom. A calibration plate coordinate system P is set to the calibration plate 10 with reference to the calibration plate 10.

Patterns provided by the calibration plate 10 are not limited to circular patterns and may be, for example, linear lattice patterns. Further, when the camera 3 is capable of performing three-dimensional measurement, as with a stereo camera, not only the planar calibration plate 10 but also an object having a cubic shape may be used as a reference member for calibration. Further, for example, the actual workpiece 6 serving as an operation target can also be used as a reference member.

Figure 6:
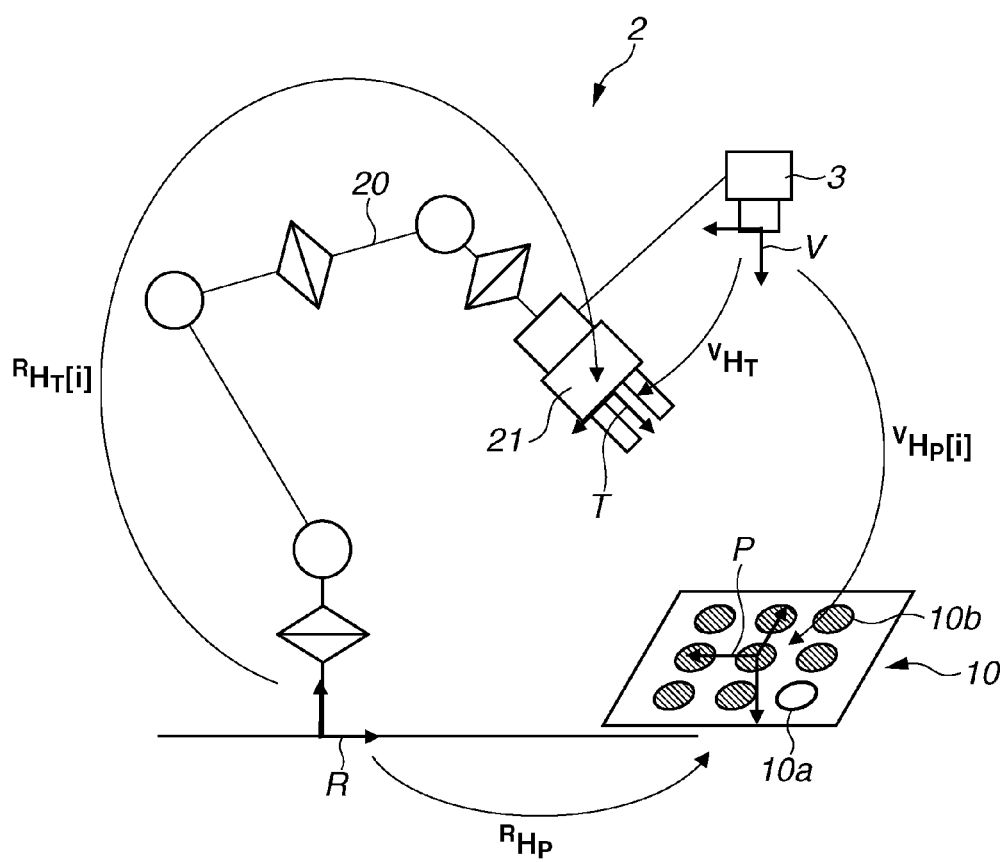
FIG. 6 illustrates a position and orientation of a robot body when calculating basic calibration values in the robot system according to the first exemplary embodiment of the present invention.

Then, as command values, the robot control unit 44 outputs to the robot body 2 a total of L positions and orientations set in each position and orientation group to sequentially position the robot body 2, as illustrated in FIG. 6. In step S5, at each position and orientation, the camera 3 measures the calibration plate 10, and stores measurement values in the RAM 42. The robot control unit 44 repeats this process (first measurement step and second measurement step). Measurement values obtained through this operation are position and orientation information of the calibration plate coordinate system P with reference to the camera coordinate system V when the robot body 2 is positioned at the i-th position and orientation. The relevant measurement value is referred to as $^V H_P[i]$.

In step S6, based on the position and orientation $^R H_T[i]$ and the measurement value $^V H_P[i]$, the robot control unit 44 calculates a relation $^V H_T$ between the camera coordinate system V and the tool coordinate system T, and a relation $^R H_P$ between the robot coordinate system R and the calibration plate coordinate system P as basic calibration values (basic calibration value calculation step). Since the relative position between the camera 3 and the hand 21, and the relative position between the robot body 2 and the calibration plate 10 are respectively fixed, the above-described relations $^V H_T$ and $^R H_P$ are fixed regardless of the position and orientation of the robot body 2. Therefore, when there is no measurement error of the camera 3 and no motion error of the robot body 2, Formula (10) is given for each position and orientation.

$$^V H_P[i] = {^V H_T} \cdot (^R H_T[i])^{-1} \cdot {^R H_P} \tag{10}$$

(i=1, 2, ..., L)

When data has been acquired for all of L positions and orientations, L Formulas (10) can be derived. Since the measurement error and the motion error are included in the actually obtained data, the robot control unit 44 calculates values of the relations $^V H_T$ and $^R H_P$ for minimizing an error (residual error) over L sets of data through error minimization calculation, and acquires these values as basic calibration values. The calculated basic calibration values are referred to as $^V H_T^{cal}$ and $^R H_P^{cal}$. A method for calculating the basic calibration values $^V H_T^{cal}$ and $^R H_P^{cal}$ is similar to the known hand-eye calibration method (refer to, for example, Hand-Eye Calibration (Radu Horaud and FadiDornaika, 1995)), and detailed descriptions thereof will be omitted.

The basic calibration values $^V H_T^{cal}$ and $^R H_P^{cal}$ are calculated in step S6 so that an error evaluation value for all of L positions and orientations is minimized. However, since an error having at least one degree of freedom is generally added to the motion of the robot body 2, the position and orientation error does not become zero. In step S7, therefore, the robot control unit 44 calculates a residual error remaining in the basic calibration values for M positions and orientations belonging to the measurement position and orientation group 7 and the operation position and orientation group 8.

The following describes processing for calculating a residual error with reference to the arrangement of each coordinate system in consideration of the error illustrated in FIG. 7. With reference to the calibration plate coordinate system P fixed to a space (base 5), when a command value $^R H_T[i]$ is given to the robot body 2, a relation $^P H_T^{predict}[i]$ between the calibration plate coordinate system P and the tool coordinate system T predicted from the basic calibration value $^R H_P^{cal}$ is represented by Formula (11).

$$^P H_T^{predict}[i] = (^R H_P^{cal})^{-1} \cdot {^R H_T[i]} \tag{11}$$

(i=1, 2, ..., M)

A relation $^P H_T^{measure}[i]$ between the calibration plate coordinate system P and the tool coordinate system T measured by the camera 3 is represented by Formula (12).

$$^P H_T^{measure}[i] = (^V T_P^{measure})^{-1} \cdot {^V H_T^{cal}} \tag{12}$$

(i=1, 2, ..., M)

Since an error having at least one degree of freedom exists in the motion of the robot body 2, the relations $^P H_T^{predict}[i]$ and $^P H_T^{measure}[i]$ do not strictly coincide with each other. When the tool coordinate system T is moved to the tool coordinate system T' with an error with respect to the prediction, the residual error of basic calibration values is calculated as a tool error $^T H_{T'}^{err}[i]$ by Formula (13).

$$^T H_{T'}^{err}[i] = (^P H_T^{predict}[i])^{-1} \cdot {^P H_T^{measure}[i]} \tag{13}$$

$$= (^R H_T[i])^{-1} \cdot {^R H_P^{cal}} \cdot (^V H_P^{measure}[i])^{-1} \cdot {^V H_T^{cal}}$$

(i = 1, 2, ..., M)

Since the tool error $^T H_{T'}^{err}[i]$ continuously changes with respect to the position and orientation of the robot body 2, closer positions and orientations of the robot body 2 will produce comparatively smaller tool errors $^T H_{T'}^{err}[i]$. Therefore, a typical tool error $^T H_{T'}^{err}[i]$ in the position and orientation groups 7 and 8 will be obtained.

In step S8, the robot control unit 44 calculates a typical tool error $^T H_{T'}^{MPose}$ in the measurement position and orientation group 7 as a measurement correction value (first correction value) for basic calibration values (first correction value calculation step). As a method for calculating the measurement correction value $^T H_{T'}^{MPose}$, the robot control unit 44 sets a residual error evaluation value F which increases with increasing difference between the tool error $^T H_{T'}^{err}[i]$ and the measurement correction value $^T H_{T'}^{MPose}$, and sets the measurement correction value $^T H_{T'}^{MPose}$ so that the residual error evaluation value F is minimized. A method for defining the residual error evaluation value F is not limited. Specifically, as the residual error evaluation value F, for example, the definition of Formula (14) can be used.

$$F = \sum_{i=1}^{N} \left| \text{pose}\{^T H_{T'}^{err}[i] \cdot (^T H_T^{MPose})^{-1}\} \right|^2 \tag{14}$$

Not only Formula (14) but also, for example, the definition of Formula (15) can be used.

$$F = \left| \sum_{i=1}^{N} \{\text{pose}(^T H_{T'}^{err}[i]) - \text{pose}(^T H_{T'}^{MPose})\} \right| \tag{15}$$

In the case of Formula (15), since the measurement correction value $^T H_{T'}^{MPose}$ is determined so that each component of pose $(^T H_{T'}^{MPose})$ becomes an average of components of pose $(^T H_{T'}^{err}[i])$, it is easy to calculate the residual error evaluation value F.

In the case of both Formulas (14) and (15), as represented by Formula (16), the measurement correction value $^T H_{T'}^{MPose}$ when the residual error evaluation value F is minimized is used as a typical measurement correction value (error value) of the measurement position and orientation group 7.

$$F \to \min \tag{16}$$

In step S9, the robot control unit 44 calculates a typical error value $^T H_{T'}^{WPose}$ in the operation position and orientation group 8 as an operation correction value (second correction value) for basic calibration values (second correction value calculation step). As a method for calculating the operation correction value $^T H_{T'}^{WPose}$, the user sets a residual error evaluation value G which increases with increasing difference between the tool error $^T H_{T'}^{err}[i]$ and the operation correction value $^T H_{T'}^{WPose}$, and sets the operation correction value $^T H_{T'}^{WPose}$ so that the residual error evaluation value G is minimized. The method for defining the residual error evaluation value G is not limited. Specifically, as the residual error evaluation value G, for example, the definition of Formula (17) can be used.

$$G = \left| \sum_{i=N+1}^{M} \{\text{pose}(^T H_{T'}^{err}[i]) - \text{pose}(^T H_{T'}^{WPose})\} \right| \quad (17)$$

In the case of Formula (17), since the operation correction value $^T H_{T'}^{WPose}$ is determined so that each component of pose ($^T H_{T'}^{WPose}$) becomes an average of components of pose ($^T H_{T'}^{err}[i]$), it is easy to calculate the residual error evaluation value G. As represented by Formula (18), the operation correction value $^T H_{T'}^{WPose}$ when the residual error evaluation value G is minimized is used as a typical operation correction value (error value) of the operation position and orientation group 8.

$$G \rightarrow \min \quad (18)$$

After acquiring basic calibration values, the measurement correction value, and the operation correction value as calibration parameters, as described above, the control apparatus 4 measures the actual workpiece 6. The following describes a case where the user positions the robot body 2 at the measurement position and orientation $^R H_T^{MPose}$, measures the workpiece 6 by using the camera 3, moves the robot body 2 to match the tool coordinate system T and the workpiece coordinate system W, and causes the hand 21 to grip the workpiece 6, as illustrated in FIGS. 8A, 8B, and 8C.

Figure 8A:
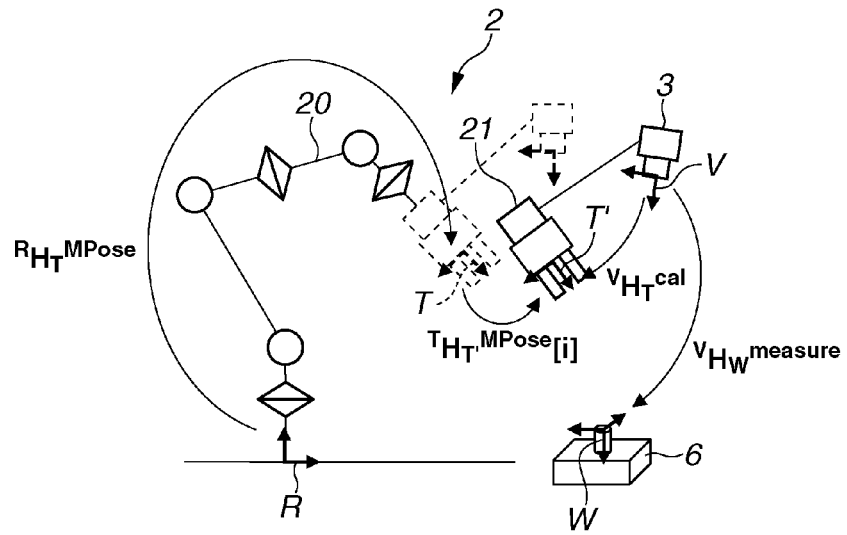
FIGS. 8A, 8B, and 8C illustrate positions and orientations of the robot body when a workpiece is gripped by the robot system according to the first exemplary embodiment of the present invention.
Figure 8B:
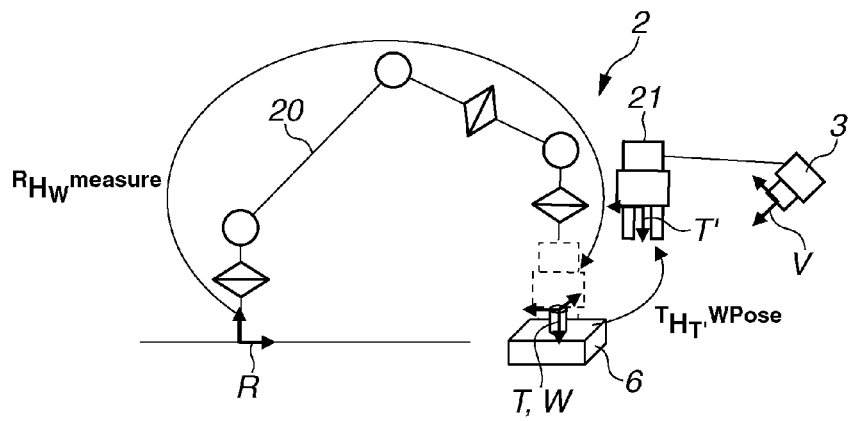
Figure 8C:
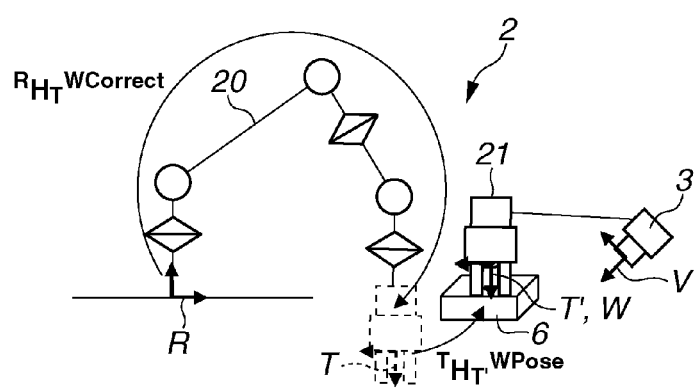

First, as illustrated in FIG. 8A, the robot control unit 44 moves the robot body 2 to the measurement position and orientation $^R H_T^{MPose}$. In step S10, the camera control unit 45 causes the camera 3 to measure the workpiece 6, and the workpiece position and orientation $^V H_W^{measure}$ calculation unit 46 obtains a measurement value (workpiece measurement step).

In step S11, based on the basic calibration values, the measurement correction value, and the operation correction value, the robot control unit 44 performs coordinate transformation on the measurement value $^V H_W^{measure}$ from the camera coordinate system V to the robot coordinate system R, and calculates a command value. In this case, the robot control unit 44 performs the following procedures.

First, if there is no error on the robot body 2, the position and orientation of the workpiece 6 in the $^R H_T^{MPose}$ ($^V H_T^{cal}$)$^{-1} \cdot ^V H_W^{measure}$. However, since the actual position and robot coordinate system R is represented by orientation of the robot body 2 includes the measurement correction value $^T H_{T'}^{MPose}$ of the measurement position and orientation group 7 as an error, a position and orientation $^R H_W^{measure}$ of the workpiece 6 in the robot coordinate system R is represented by Formula (19).

$$^R H_W^{measure} = ^R H_T^{MPose} \cdot ^T H_{T'}^{MPose} \cdot (^V H_T^{cal})^{-1} \cdot ^V H_W^{measure} \quad (19)$$

Then, based on the position and orientation $^R H_W^{measure}$ of the workpiece 6 in the robot coordinate system R, the robot control unit 44 causes the hand 21 to approach the workpiece 6. As illustrated in FIG. 8B, when the robot control unit 44 controls the robot body 2 by using the position and orientation $^R H_W^{measure}$ as a command value, the robot body 2 includes the operation correction value $^T H_{T'}^{WPose}$ of the operation position and orientation group 8 as an error. Therefore, the robot body 2 moves to the position (the solid line illustrated in FIG. 8B) where the operation correction value $^T H_{T'}^{WPose}$ is included as an error. To match the tool coordinate system T and the workpiece coordinate system W with high accuracy, the robot control unit 44 multiplies the position and orientation $^R H_W^{measure}$ of the workpiece 6 by the inverse transformation formula of the operation correction value $^T H_{T'}^{WPose}$. Then, the robot control unit 44 calculates a command value $^R H_T^{WCorrect}$ to be transmitted to the robot body 2 by using Formula (20).

$$^R H_T^{WCorrect} = ^R H_W^{measure} \cdot (^T H_{T'}^{WPose})^{-1} \quad (20)$$

When Formula (19) is assigned to Formula (20), the final command value $^R H_T^{WCorrect}$ including calibration parameters can be obtained as represented by Formula (21). In the present exemplary embodiment, the robot control unit 44 performs the coordinate transformation step, the command value calculation step, the first calculation step for calculating the measurement calibration value, and the second calculation step for calculating the operation calibration value through calculation by Formula (21).

$$^R H_T^{WCorrect} = ^R H_T^{MPose} \cdot ^T H_{T'}^{MPose} \cdot (^V H_T^{cal})^{-1} \cdot ^V H_W^{measure} \cdot (^T H_{T'}^{WPose})^{-1} \quad (21)$$

Formula (21) calculates a command value by using the basic calibration values, the measurement correction value, and the operation correction value as they are. In this case, Formula (21) can be replaced with another one for calculating the measurement calibration value (first calibration value) based on the basic calibration values and the measurement correction value, and calculating the operation calibration value (second calibration value) based on the basic calibration values and the operation correction value. Specifically, Formula (21) can be replaced with another one for calculating a command value by using the two calibration values, that is, the measurement calibration value and the operation calibration value.

When performing an operation on the workpiece 6, the robot control unit 44 calculates a new command value to the robot body 2 based on the measurement value $^V H_W^{measure}$ and calibration parameters, and then activates the robot body 2. In step S12, as illustrated in FIG. 8C, the robot control unit 44 calculates the command value $^R H_T^{WCorrect}$ through calculation by Formula (21), and outputs the command value $^R H_T^{WCorrect}$ to the robot body 2 to cause the robot body 2 to approach the workpiece 6 (motion step). This step negates an error in each position and orientation group, causes the hand 21 to approach the workpiece 6 with high accuracy, and matches the tool coordinate system T and the workpiece coordinate system W with high accuracy, which realizes highly accurate gripping by the hand 21 of the workpiece 6.

As described above, in the robot system 1 according to the present exemplary embodiment, the robot control unit 44 calculates the basic calibration values based on all of positions and orientations of the three position and orientation groups, and calculates the correction value based on the positions and orientations of the measurement position and orientation group 7 and the operation position and orientation group 8 out of the three groups. Then, the robot control unit 44 performs coordinate calibration by using the basic calibration values, the measurement correction value, and the operation correction value, and calculates the command value. This improves the accuracy in coordinate calibration in comparison with a case where coordinate calibration is performed by using only positions and orientations of the measurement position and orientation group 7. Thus, the accuracy in position and orientation control during motion of the robot body 2 can be improved.

Further, even in a case where Formula (21) is replaced with another one for calculating the command value by using the two calibration values (the measurement calibration value and the operation calibration value), coordinate calibration can be performed by using a plurality of calibration values. This improves the accuracy in coordinate calibration in comparison with a case where, for example, coordinate calibration is performed by using one calibration value which is calculated mainly based on the measurement position and orientation.

Further, in the robot system 1 according to the present exemplary embodiment, the user sets offset values which are predefined as illustrated in the table in FIG. 5, to the control apparatus 4, and captures an image of the calibration plate 10 by using the camera 3 at all positions and orientations. Therefore, automating operations ranging from imaging of the calibration plate 10 to the calculation of calibration values in this way can reduce operation time and prevent variation in the accuracy of the acquired calibration values in comparison with a case where the operator teaches the robot body 2 the measurement position and orientation through the operation position and orientation.

Above-described Formula (21) calculates a command value by using the basic calibration values, the measurement correction value, and the operation correction value as they are. However, the method for calculating a command value is not limited thereto. It is also possible to calculate the measurement calibration value (first calibration value) based on the basic calibration values and the measurement correction value, calculate the operation calibration value (second calibration value) based on the basic calibration values and the operation correction value, and calculate the command value by using the two calibration values, that is, the measurement calibration values and the operation calibration value.

In this case, step S6 for calculating the basic calibration values, step S7 for calculating a residual error, step S8 for calculating the measurement correction value, and step S11 for calculating the measurement calibration value constitute the first calibration value calculation step. Further, step S6 for calculating the basic calibration values, step S7 for calculating a residual error, step S9 for calculating the operation correction value, and step S11 for calculating the operation calibration value constitute the second calibration value calculation step. Coordinate calibration can be performed by using a plurality of calibration values calculated based on the positions and orientations of the two position and orientation groups 7 and 8. This improves the accuracy in coordinate calibration in comparison with a case where, for example, coordinate calibration is performed by using one calibration value which is calculated mainly based on the measurement position and orientation.

The following describes a robot system 1 according to a second exemplary embodiment of the present invention. In the present exemplary embodiment, the hardware configuration of the robot system 1 is similar to that in the first exemplary embodiment, and components equivalent to those in the first exemplary embodiment are assigned the same reference numerals and the description thereof will be omitted.

Figure 9:
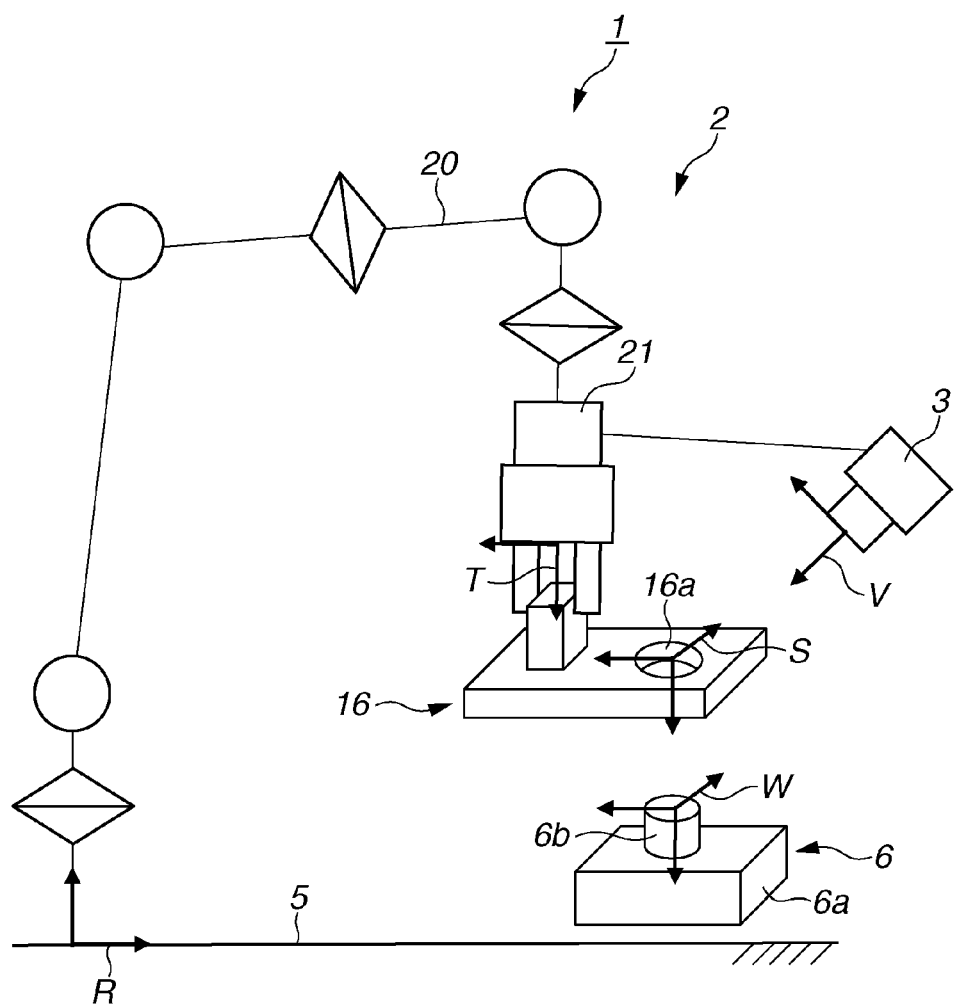
FIG. 9 illustrates an assembly part and a workpiece used in a robot system according to a second exemplary embodiment of the present invention.

In the present exemplary embodiment, as illustrated in FIG. 9, an assembly part 16, which can be assembled to the workpiece 6 being used in the first exemplary embodiment, will be used. A gripped object coordinate system S is set to the assembly part 16 with reference to the assembly part 16.

The following describes with reference to the flowchart illustrated in FIG. 10 processing for matching the gripped object coordinate system S and the workpiece coordinate system W to move the robot body 2 so as to fit the assembly part 16 into the workpiece 6 in the above-described robot system 1 according to the second exemplary embodiment. It is assumed that the basic calibration values, the measurement correction value, and the operation correction value have been acquired with similar procedures to the first exemplary embodiment.

In step S21, the robot control unit 44 causes the hand 21 to grip the assembly part 16, and the camera control unit 45 causes the camera 3 to measure the assembly part 16 (assembly part measurement step). If the hand 21 grips the assembly part 16 in a fixed state, the tool coordinate system T and the gripped object coordinate system S move integrally, and the assembly part 16 can be measured by the camera 3 at an arbitrary position and orientation of the robot body 2.

With this measurement, the workpiece position and orientation calculation unit 46 obtains a position and orientation $^{V}H_{S}^{measure}$ of the assembly part 16 in the camera coordinate system V, and obtains a relative position and orientation $^{T}H_{S}^{measure}$ between the tool coordinate system T and the gripped object coordinate system S based on the basic calibration value $^{V}H_{T}^{cal}$, by using Formula (22).

$$^{T}H_{S}^{measure} = (^{V}H_{T}^{cal})^{-1} \cdot {}^{V}H_{S}^{measure} \tag{22}$$

In step S22, the robot control unit 44 moves the robot body 2 to the measurement position and orientation, and measures the workpiece 6 by using the camera 3 (workpiece measurement step) to obtain the position and orientation $^{R}H_{W}^{measure}$ of the workpiece 6 in the robot coordinate system R. Measurement in this step is similar to that in step S10 in the first exemplary embodiment. The position and orientation $^{R}H_{W}^{measure}$ is calculated by using Formula (23) in consideration of the measurement correction value $^{T}H_{T'}^{MPose}$ as with Formula (19).

$$^{R}H_{W}^{measure} = {}^{R}H_{T}^{MPose} \cdot {}^{T}H_{T'}^{MPose} \cdot (^{V}H_{T}^{cal})^{-1} \cdot {}^{V}H_{W}^{measure} \tag{23}$$

In step S23, based on the basic calibration values, the measurement correction value, and the operation correction value, the robot control unit 44 performs coordinate transformation on the measurement value $^{V}H_{S}^{measure}$ and the measurement value $^{V}H_{W}^{measure}$ from the camera coordinate system V to the robot coordinate system R, and calculates the command value. In this case, the robot control unit 44 performs the following procedures.

First, to overlap the gripped object coordinate system S onto the workpiece coordinate system W in consideration of the relation between the tool coordinate system T and the gripped object coordinate system S, the robot control unit 44 obtains a target position and orientation $^{R}H_{T}^{target}$ to which the tool coordinate system T is to be moved, by using Formula (24).

$$^{R}H_{T}^{target} = {}^{R}H_{W}^{measure} \cdot (^{T}H_{S}^{measure})^{-1} \tag{24}$$

If Formulas (22) and (23) are assigned to Formula (24), the target position and orientation $^{R}H_{T}^{target}$ can be obtained, as represented by Formula (25).

$$^{R}H_{T}^{target} = {}^{R}H_{T}^{MPose} \cdot {}^{T}H_{T'}^{MPose} \cdot (^{V}H_{T}^{cal})^{-1} \cdot {}^{V}H_{W}^{measure} \cdot (^{V}H_{S}^{measure})^{-1} \cdot {}^{V}H_{T}^{cal} \tag{25}$$

However, if the target position and orientation $^{R}H_{T}^{target}$ to which the tool coordinate system T is to be moved is used as a command value, the operation correction value $^{T}H_{T'}^{WPose}$ will be included as an error. Therefore, to move the tool coordinate system T of the robot body 2 to the target position and orientation $^{R}H_{T}^{target}$, a command value $^{R}H_{T}^{WCorrect2}$ to be transmitted to the robot body 2 is represented by Formula (26) so that the operation correction value $^{T}H_{T'}^{WPose}$ as an error is negated.

$$^{R}H_{T}^{WCorrect2} = {}^{R}H_{T}^{target} \cdot (^{T}H_{T'}^{WPose})^{-1} \tag{26}$$

If Formula (25) is assigned to Formula (26), the final command value $^{R}H_{T}^{target}$ which includes the calibration values can be obtained, as represented by Formula (27). In the present exemplary embodiment, the robot control unit 44 performs the assembly coordinate transformation step, the assembly command value calculation step, the first calculation step, and the second calculation step through calculation by Formula (27).

$$^{R}H_T^{WCorrect2} = {^{R}H_T^{MPose}} \cdot {^{T}H_{T'}^{MPose}} \cdot (^{V}H_T^{cal})^{-1} \cdot {^{V}H_W^{measure}} \cdot (^{V}H_S^{measure})^{-1} \cdot {^{V}H_T^{cal}} \cdot ({^{T}H_{T'}^{WPose}})^{-1} \quad (27)$$

Formula (27) calculates the command value by using the basic calibration values, the measurement correction value, and the operation correction value as they are. In this case, similar to the first exemplary embodiment, Formula (27) can be replaced with another one for calculating the measurement calibration value based on the basic calibration values and the measurement correction value, and calculating the operation calibration value based on the basic calibration values and the operation correction value. Specifically, Formula (27) can be replaced with another one for calculating the command value by using the two calibration values, that is, the measurement calibration value and the operation calibration value.

When assembling the assembly part 16 to the workpiece 6, the robot control unit 44 calculates a new command value for the robot body 2 based on the measurement value $^{T}H_S^{measure}$, the measurement value $^{V}H_W^{measure}$, and calibration parameters, and then activates the robot body 2. In step S24, the robot control unit 44 calculates the command value $^{R}H_T^{WCorrect2}$ through calculation by Formula (27), and outputs the command value $^{R}H_T^{WCorrect2}$ to the robot body 2 to cause the robot body 2 to move the assembly part 16 to the workpiece 6 (motion step). This step negates an error in each position and orientation group, causes the assembly part 16 to approach the workpiece 6 with high accuracy, and matches the gripped object coordinate system S and the workpiece coordinate system W with high accuracy, which realizes highly accurate assembly work of the assembly part 16 to the workpiece 6.

As described above, in the robot system 1 according to the present exemplary embodiment, the robot control unit 44 measures both the assembly part 16 and the workpiece 6. Therefore, even if the positions and orientations of both the assembly part 16 and the workpiece 6 vary at high frequency, high-accuracy assembly can be performed without performing manual adjustment.

In the robot system 1 according to the present exemplary embodiment, the description is given of the case where the assembly part 16 gripped by the hand 21 approaches the workpiece 6. However, the operation of the robot system 1 is not limited thereto and may be performed in such a way that a tool, such as a drill attached to the end of the arm 20 as an end effector, approaches the workpiece 6.

The robot systems 1 according to the first exemplary embodiment and the second exemplary embodiment is described to use the monocular camera 3 as a visual sensor. However, the visual sensor is not limited thereto and may be, for example, a stereo camera or a laser scanner. When a laser scanner is used, for example, the robot control unit 44 measures the workpiece 6 by using the laser scanner, and the camera control unit 45 acquires a result of the measurement as three-dimensional measurement point group data. Then, the workpiece position and orientation calculation unit 46 performs matching between the three-dimensional measurement point group data and a three-dimensional computer-aided design (CAD) model, and calculates the position and orientation of the workpiece 6.

The above-described processing and operations according to the first exemplary embodiment and the second exemplary embodiment are actually performed by the control apparatus 4. Therefore, a recording medium storing a software program for implementing the above-described functions may be supplied to the control apparatus 4 so that the CPU 40 of the control apparatus 4 reads the program stored in the recording medium and then executes it to realize the above-described processing and operations. In this case, the program itself read from the recording medium implements the functions of the above-described exemplary embodiments, and the program itself and the recording medium storing the program will constitute a robot system 1 according to an exemplary embodiment of the present invention.

Although, in the above-described exemplary embodiments, the program is described to be stored in the ROM 41 as a computer-readable recording medium, the recording medium is not limited thereto. The program may be stored in any types of computer-readable recording medium, such as a hard disk drive (HDD), an external storage device, and a recording disk.

According to the exemplary embodiments of the present invention, calibration values are calculated based on positions and orientations of at least two position and orientation groups, and a robot body is operated by using at least the two calibration values. Since a plurality of calibration values calculated based on a plurality of position and orientation groups can be used, it is possible to improve the accuracy in coordinate calibration in comparison with a case where coordinate calibration is performed by using one calibration value which is calculated mainly based on a measurement position and orientation of a workpiece. Thus, the accuracy in position and orientation control during motion of the robot body can be improved. Further, since a manual teaching operation is not required, it is possible to prevent an increase in calibration operation time and prevent variation in the accuracy depending on the skill level of the operator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-026158 filed Feb. 14, 2013, which is hereby incorporated by reference herein in its entirety.

What is claimed is:

1. A robot system comprising:
   a robot body including an articulated arm and an end effector supported by the articulated arm;
   a visual sensor provided on the robot body; and
   a control apparatus configured to control a position and orientation of the robot body, and to calculate a position and orientation of a workpiece by using a measurement value measured via the visual sensor,
   wherein the control apparatus performs processing comprising:
      measuring, via the visual sensor, a reference member at each position and orientation of a first position and orientation group including a first reference position and orientation of the robot body and a position and orientation of the robot body within a first offset range surrounding the first reference position and orientation;
      calculating a first calibration value by using the measurement value of the reference member, the measurement value being measured via the visual sensor at each position and orientation of the first position and orientation group;
      measuring, via the visual sensor, the reference member at each position and orientation of a second position and orientation group including a second reference position and orientation of the robot body, which is different from the first reference position and orientation, and a position and orientation of the robot body within a second offset range surrounding the second reference position and orientation, the second offset range being a range separated from the first offset range, or being a range whose one part overlaps the first offset range and another part does not overlap the first offset range;

calculating a second calibration value by using the measurement value of the reference member, the measurement value being measured via the visual sensor at each position and orientation of the second position and orientation group;

moving the robot body to the first reference position and orientation to measure the workpiece via the visual sensor followed by calibration using the first calibration value, and then, moving the robot body close to the second reference position and orientation followed by calibration using the second calibration value; and activating the robot body.

2. The robot system according to claim 1, wherein the first reference position and orientation is a position and orientation at which the visual sensor faces the workpiece straighter than at the second reference position and orientation.

3. The robot system according to claim 1, wherein the second reference position and orientation is a position and orientation at which the end effector faces the workpiece straighter than at the first reference position and orientation.

4. The robot system according to claim 1, wherein the control apparatus further performs processing comprising:

calculating a basic calibration value by using the measurement value of the reference member, the measurement value being measured via the visual sensor at each position and orientation of the first position and orientation group and the second position and orientation group;

calculating a first correction value for the basic calibration value by using the measurement value of the reference member, the measurement value being measured via the visual sensor at each position and orientation of the first position and orientation group;

calculating the first calibration value based on the first correction value and the basic calibration value;

calculating a second correction value for the basic calibration value by using the measurement value of the reference member, the measurement value being measured via the visual sensor at each position and orientation of the second position and orientation group; and calculating the second calibration value based on the second correction value and the basic calibration value.

5. The robot system according to claim 1, wherein an assembly part that is to be assembled to the workpiece is gripped by the end effector, and the workpiece is supported by a base supporting the articulated arm, and wherein the control apparatus further performs processing comprising:

measuring the assembly part via the visual sensor;

executing coordinate transformation on the measurement value of the assembly part and the measurement value of the workpiece from a coordinate system of the visual sensor to a coordinate system of the robot body by using the first calibration value and the second calibration value; and calculating, by using the measurement value of the assembly part and the measurement value of the workpiece having undergone the coordinate transformation, a command value for moving the robot body so that the assembly part is assembled to the workpiece.

6. A method for controlling a robot system comprising:

a robot body including an articulated arm and an end effector supported by the articulated arm;

a visual sensor provided on the robot body; and a control apparatus configured to control a position and orientation of the robot body, and to calculate a position and orientation of a workpiece by using a measurement value measured via the visual sensor, the method comprising:

causing the control apparatus to measure, via the visual sensor, a reference member at each position and orientation of a first position and orientation group including a first reference position and orientation of the robot body and a position and orientation of the robot body within a first offset range surrounding the first reference position and orientation;

causing the control apparatus to calculate a first calibration value by using the measurement value of the reference member, the measurement value measured via the visual sensor at each position and orientation of the first position and orientation group;

causing the control apparatus to measure, via the visual sensor, the reference member at each position and orientation of a second position and orientation group including a second reference position and orientation of the robot body, which is different from the first reference position and orientation, and a position and orientation of the robot body within a second offset range surrounding the second reference position and orientation, the second offset range being a range separated from the first offset range, or being a range whose one part overlaps the first offset range and another part does not overlap the first offset range;

causing the control apparatus to calculate a second calibration value by using the measurement value of the reference member, the measurement value being measured via the visual sensor at each position and orientation of the second position and orientation group;

causing the control apparatus to move the robot body to the first reference position and orientation to measure the workpiece via the visual sensor followed by calibration using the first calibration value, and then, moving the robot body close to the second reference position and orientation followed by calibration using the second calibration value; and causing the control apparatus to activate the robot body.

7. The method according to claim 6, wherein the first reference position and orientation is a position and orientation at which the visual sensor faces the workpiece straighter than at the second reference position and orientation.

8. The method according to claim 6, wherein the second reference position and orientation is a position and orientation at which the end effector faces the workpiece straighter than at the first reference position and orientation.

9. The method according to claim 6, further comprising:

causing the control apparatus to calculate a basic calibration value by using the measurement value of the reference member, the measurement value being measured via the visual sensor at each position and orientation of the first position and orientation group and the second position and orientation group;

causing the control apparatus to calculate a first correction value for the basic calibration value by using the measurement value of the reference member, the measurement value being measured via the visual sensor at each position and orientation of the first position and orientation group;

causing the control apparatus to calculate the first calibration value based on the first correction value and the basic calibration value;

causing the control apparatus to calculate a second correction value for the basic calibration value by using the measurement value of the reference member, the measurement value being measured via the visual sensor at each position and orientation of the second position and orientation group; and causing the control apparatus to calculate the second calibration value based on the second correction value and the basic calibration value.

10. The method according to claim 6,
wherein an assembly part that is to be assembled to the workpiece is gripped by the end effector, and the workpiece is supported by a base supporting the articulated arm, the method further comprising:
causing the control apparatus to measure the assembly part via the visual sensor;

causing the control apparatus to execute coordinate transformation on the measurement value of the assembly part and the measurement value of the workpiece from a coordinate system of the visual sensor to a coordinate system of the robot body, by using the first calibration value and the second calibration value; and causing the control apparatus to calculate, by using the measurement value of the assembly part and the measurement value of the workpiece having undergone the coordinate transformation, a command value for moving the robot body so that the assembly part is assembled to the workpiece.

11. A non-transitory computer-readable storage medium storing a program that causes a computer to execute a method for controlling a robot system, the robot system comprising:
a robot body including an articulated arm and an end effector supported by the articulated arm;
a visual sensor provided on the robot body; and
a control apparatus configured to control a position and orientation of the robot body, and to calculate a position and orientation of a workpiece by using a measurement value measured via the visual sensor, the method comprising:
causing the control apparatus to measure, via the visual sensor, a reference member at each position and orientation of a first position and orientation group including a first reference position and orientation of the robot body and a position and orientation of the robot body within a first offset range surrounding the first reference position and orientation;

causing the control apparatus to calculate a first calibration value by using the measurement value of the reference member, the measurement value measured via the visual sensor at each position and orientation of the first position and orientation group;

causing the control apparatus to measure, via the visual sensor, the reference member at each position and orientation of a second position and orientation group including a second reference position and orientation of the robot body, which is different from the first reference position and orientation, and a position and orientation of the robot body within a second offset range surrounding the second reference position and orientation, the second offset range being a range separated from the first offset range, or being a range whose one part overlaps the first offset range and another part does not overlap the first offset range;

causing the control apparatus to calculate a second calibration value by using the measurement value of the reference member, the measurement value being measured via the visual sensor at each position and orientation of the second position and orientation group;

causing the control apparatus to move the robot body to the first reference position and orientation to measure the workpiece via the visual sensor followed by calibration using the first calibration value, and then, moving the robot body close to the second reference position and orientation followed by calibration using the second calibration value; and causing the control apparatus to activate the robot body.

* * * * *